United States Patent

[11] 3,601,715

[72] Inventor Bruce G. Pringle
Ottawa, Ontario, Canada
[21] Appl. No. 872,483
[22] Filed Oct. 30, 1969
[45] Patented Aug. 24, 1971
[73] Assignee Northern Electric Company Limited
Montreal, Quebec, Canada

[54] TRANSFORMERLESS DOUBLE-BALANCED MODULATOR APPARATUS
4 Claims, 4 Drawing Figs.

[52] U.S. Cl. 332/31 T, 307/240, 307/248, 332/43 B
[51] Int. Cl. H03c 1/42
[50] Field of Search 332/14, 16 T, 43 B, 31, 31 T; 307/240, 248; 330/30 D

[56] References Cited
UNITED STATES PATENTS

| | | | |
|---|---|---|---|
| 3,323,070 | 5/1967 | Hayes | 330/30 D UX |
| 3,328,710 | 6/1967 | Baldwin | 332/43 B X |
| 3,329,910 | 7/1967 | Moses | 332/31 T |
| 3,435,362 | 3/1969 | Pamlenyi | 330/30 D |

*Primary Examiner*—Alfred L. Brody
*Attorney*—Craig, Antonelli, Stewart & Hill

ABSTRACT: A transformerless double-balanced modulator circuit using two transistors having a common collector load with electrical interconnections between the electrodes of the two transistors, a carrier voltage being, in use, applied to the base electrode of one of said transistors and an information signal voltage being applied, in use, to the base electrode of the other of said transistors, a modulated output being obtained at the common collector load. If desired, a transistor driver stage may be provided for each of said two transistors.

Inventor

BRUCE G. PRINGLE

By

Johnson, Marcus & Gray Attorneys

Inventor

BRUCE G. PRINGLE

By

Johnson, Marcus & Gray

Attorneys

TRANSFORMERLESS DOUBLE-BALANCED MODULATOR APPARATUS

This invention relates to improvements in electrical signal modulation apparatus and more particularly to a novel transformerless double-balanced signal modulator circuit design.

The double-balanced modulator is used extensively in multiplex telephone equipment and could, of course, be conveniently used in any single sideband equipment.

The best previous modulators use balanced transformers which are bulky and expensive. Some modulators have previously been designed without transformers but these have proved to be rather costly and not economical in the use of electrical components. One typical system utilizes an arrangement of diodes in a pair of switching means which are supplied with signals from transistor circuits.

It is an object of the present invention to provide an improved modulator wherein it is not necessary to utilize balanced transformers and which is more economical in manufacture than the above-mentioned modulator utilizing diodes.

Accordingly the present invention provides a modulator comprising a first and a second transistor having a common collector load, connected between the collector electrodes of said transistors and a first potential point, a first resistor circuit connected between said first potential point and a second potential point at a different potential, the base electrode of the first transistor being connected to a first intermediate tapping point in said first resistor circuit, and to the emitter of said second transistor, a second resistor circuit connected between said first potential point and said second potential point, the base electrode of the second transistor being connected to a second intermediate tapping point in said second resistor circuit and to the emitter of said first transistor, means for applying a first voltage input signal to one of said intermediate points, means for applying a second voltage input signal to one of said intermediate points, whereby the output signal obtainable from said common collector load is the sum of difference of said first and second voltage input signals.

Figure 1:
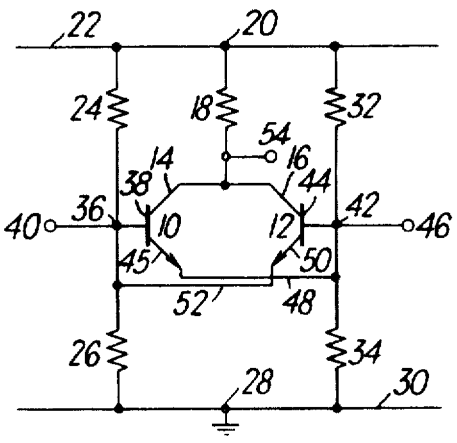
Figure 2:
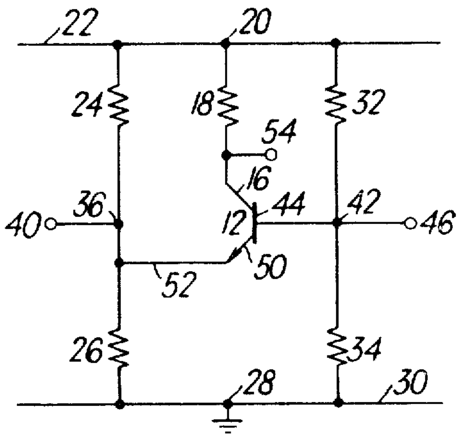
Figure 3:
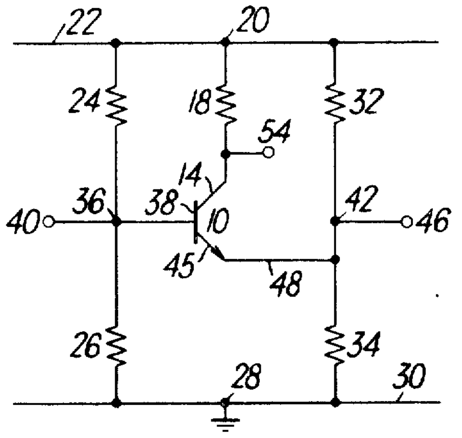
Figure 4:
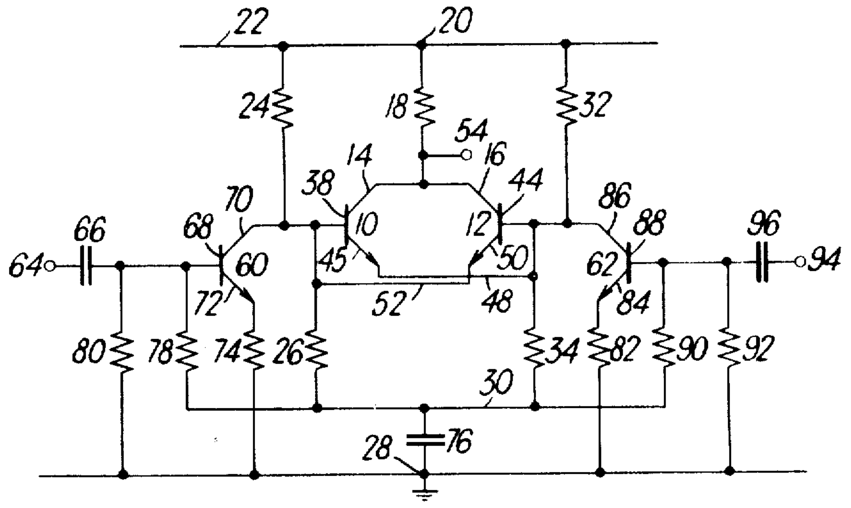

Embodiments of the present invention will now be described by way of example, with reference to the accompanying drawings:

FIG. 1 diagrammatically illustrates a basic circuit of a modulator according to the present invention;

FIGS. 2 and 3 each show part of the circuit of FIG. 1 for the purpose of describing the operation of the circuit thereof; and FIG. 4 diagrammatically illustrates a modulator circuit incorporating the basic modulator circuit of FIG. 1.

Referring to FIG. 1 there is illustrated a modulator circuit including a first NPN transistor 10 and a second NPN transistor 12. The respective collector electrodes 14 and 16 are connected through a common collector load resistor 18 to a first potential point 20 which is at a first positive potential. The point 20 is part of the positive supply line 22 for the transistor circuit. A first resistor circuit comprising resistors 24 and 26 is connected between the potential line 22, i.e. the potential point 20, and a second potential point 28 which is at a different potential, i.e. ground, to the first potential point 20. As will be seen from the circuit, one end of the resistor 26 is connected to the common ground line 30. Similarly a second resistor circuit comprising resistors 32 and 34 is also connected between the positive potential line 22 and the ground potential line 30.

A first intermediate tapping point 36 on the first resistor circuit is connected to the base electrode 38 of the first transistor 10 and is also connected to a signal input terminal 40. Similarly a second intermediate tapping point 42 in the second resistor circuit is connected to the base electrode 44 of the second transistor 12 and also to a carrier input terminal 46.

In a practical circuit the resistance of resistor 24 was made equal to the resistance of resistor 32 whilst the resistance of resistor 26 was made equal to the resistance of resistor 34.

As will be seen from FIG. 1, the emitter electrode 45 of the first transistor 10 is connected by way of a connection 48 to the tapping point 42 and thus to the base electrode 44 of the second transistor 12. Also, the emitter electrode 50 of the second transistor 12 is connected by way of connection 52 to the first tapping point 36 and thus to the base electrode 38 of the first transistor 10.

The output terminal 54 of the circuit of FIG. 1 is connected to the junction of the leads from the collector electrodes 14 and 16 of the first and second transistors respectively to one end of the common collector load 18. Thus, an output signal from the output terminal 54 may be obtained which is a modulated output corresponding to the signal input at terminal 40 and the carrier input at terminal 46. In other words, the output signal obtainable from the common collector load 18 will be the sum or difference of the voltage input signals applied to the terminals 40 and 46.

FIGS. 2 and 3 illustrate portions of FIG. 1 for the purpose of describing the operation thereof. A first voltage input signal representing information is, in operation, applied to the terminal 40 whilst a second voltage input signal, being a carrier signal, is applied to the other terminal 46. FIGS. 2 and 3 illustrate portions of the circuit of FIG. 1 and will be utilized to describe the operation thereof. FIG. 2 will be utilized to describe the operation for the positive half-cycle of the carrier voltage signal whilst FIG. 3 will be utilized to describe the operation of the circuit of FIG. 1 when the negative half-cycle of the carrier input waveform is applied to terminal 46.

The application of the positive half-cycle of the carrier voltage waveform to terminal 46 causes the voltage to be applied to the base electrode 44 of transistor 12. This positive waveform causes the transistor to be switched to a conducting state, i.e. on, whilst the application of the same positive waveform by way of connection 48 (FIG. 1) to the emitter 45 of transistor 10 is effective to switch that transistor to a nonconducting state, i.e. turn it off. Thus the information signal voltage ($f_s$) at terminal 40 is applied by way of connection 52 to the emitter electrode 50 of the second transistor 12 and a modulated output is obtained at the output terminal 54 connected to the common resistor load 18. As will be appreciated, the signal voltage ($f_s$) applied through the common base stage of transistor 12 is subject to 0° of phase shift (in other words is not subject to any phase shift). However, the carrier voltage ($f_c$) which is applied to the base electrode 44 of transistor 12 is phase shifted by 180°. Thus the voltage on the collector electrode 16 of transistor 12, which is applied to the output terminal 54, is a composite voltage made up of the relatively large inverted half-cycle of the input carrier waveform signal and the relatively smaller noninverted information signal input ($f_s$).

The negative half-cycle of the carrier waveform input voltage is, of course, applied to the terminal 46 following the positive half-cycle. The application of the negative half-cycle of the carrier waveform voltage to the base electrode 44 of transistor 12 is effective to switch that transistor to a nonconducting state, i.e. turn if off. The voltage is also applied by way of connection 48 (FIGS. 1 and 3) to the emitter electrode 45 of transistor 10. This results in the transistor 10 being switched to a conducting state, i.e. turned on, and when the information input signal voltage ($f_s$) is applied to the base electrode 38 of transistor 10, a common emitter stage, then the information input voltage is subject to a 180° phase shift through the transistor. The output therefrom is again taken from terminal 54 and it will be apparent that the carrier voltage signal ($f_c$) applied to the emitter electrode 45 of transistor 10 is subject to no phase shift during this half-cycle.

During this negative half-cycle of the carrier input voltage waveform the voltage appearing on the collector electrode 14 of transistor 10 is a composite voltage made up of the relatively large noninverted half-cycle of the carrier voltage input and the relatively smaller inverted information signal input ($f_s$).

As will be clear, the carrier input voltage ($f_c$) is much larger than the information signal input voltage ($f_s$) and it therefore controls the switching on and off of the transistors 10 and 12. As explained above, the carrier input signal is inverted when it is switched through the second transistor 12 but is not subject to inversion when it is switched through the first transistor 10. Therefore the frequency of the output signal is $2f_c$ plus the harmonics of the carrier and the basis frequency $f_c$ is cancelled. As will be clear from the above description, with each half-cycle of the carrier waveform applied to the terminal 46, the information signal applied to terminal 40 is phase inverted and this results in the cancellation of the signal component at the frequency $f_s$ at the collector electrodes 14 and 16 of the transistors 10 and 12. In this way the switching action produced by the carrier input at terminal 46, whereby the phase of the input information signal ($f_s$) is changed, results in the output at terminal 54 being the desired modulated output of $f_c \pm f_s$, i.e. is a modulated combination of $f_c$ and $f_s$.

From the above description it will be seen that the circuit including the two transistors 10 and 12 functions as a double-balanced modulator circuit. Transistor driver stages can be conveniently provided and the circuit of FIG. 4 illustrates two such driver stages provided in associated with the basic modulator circuit of FIG. 1. In FIG. 4 the same reference numerals are applied to like parts as have been used in FIG. 1.

Referring to FIG. 4, the first and second transistors 10 and 12 are respectively provided with driver stage transistors 60 and 62. The information signal is applied to a signal input terminal 64 which is connected through a capacitor 66 to the base electrode 68 of transistor 60, having a collector electrode 70 and an emitter electrode 72. As will be seen from FIG. 4, the collector electrode 70 is connected to the base electrode 38 of transistor 10 whilst the emitter electrode 72 is connected through a resistor 74 to ground potential at 28. A capacitor 76 is connected between ground potential and the common line 30 to which one end of the resistors 26 and 34 are connected.

A resistor 78 is connected between the base electrode 68 of transistor 60 and the common line 30 whilst a further resistor 80 is connected between the base electrode 68 and ground potential 28. In a similar manner, a resistor 82 is connected between the emitter electrode 84 of a second carrier driver transistor 62 having a base electrode 88 and a collector electrode 86. The collector electrode 86 is, as shown, connected to the base electrode 44 of transistor 12 and also to the lower end of resistor 32 whilst a resistor 90 is connected between the base electrode 88 and the common line 39. A further resistor 92 is connected between the base electrode 88 and ground potential 28.

The carrier waveform voltage input is applied, in operation, to a carrier input terminal 94 and thus through a capacitor 96 to the base electrode 88 of transistor 86.

As will be clear from FIG. 4 the transistor 60 operates as a driver stage for the information signal input at frequency, $f_s$, as well as providing the required DC voltage at the base of transistor 10. Similarly, transistor 62 operates as a driver stage for the carrier input which is thus applied to the base electrode 44 of transistor 12. The modulated transistors 10 and 12 perform a phase-inverting, switching function which results in the required modulation and double-balancing effect.

The resistors 80, 78, 90 and 92 are so designed that they provide the correct bias voltages for the base electrodes of the respective transistors 60 and 62. As will be appreciated, the resistors 74 and 82 determine both the AC and DC conditions for the two input driver stages. Resistors 24 and 32 function as loads in the collector circuits of transistors 60 and 62 respectively and these are thus effective to determine the voltage which is present at the base electrodes of the transistors 10 and 12. Resistors 26 and 34 are provided so as to reduce the AC voltage swing on the collector electrodes 70 and 86 of the transistors 60 and 62 as well as providing a path for the DC feedback from the collector electrodes 70 and 86 to the base electrodes 68 and 88 of transistors 60 and 62. Capacitor 76 between the common line 30 and ground potential at 28 is designed to eliminate the AC feedback over the DC feedback path as well as to filter the AC signal appearing at the collector electrodes 70 and 86 of the transistors 60 and 62. This therefore provides most of the current which is required for the bias resistors 80, 78, 90 and 92 at the base electrodes 68 and 88. As will be understood, the DC feedback reduces the supply current which is required to stabilize the DC conditions of transistors 60 and 62 so far as variations in supply voltage, temperature and transistor characteristics are concerned. The resistor 18 as mentioned above, functions as a collector load for the transistors 10 and 12 as well as being designed as a correct source resistance for the filter network which receives the output signal appearing at terminal 54.

In operation, the transistors 10 and 12 are alternately switched from a nonconducting, off, state to a conducting linear, on, state and it will be appreciated that the gain through the two transistors is the same when a signal is applied from the respective input terminals 64 and 94. As will be seen, the circuit is completely symmetrical and the information signal input and the carrier signal input terminals could be interchanged without there being any change in the operation of the illustrated circuit. The information signal input and the carrier input are both subject to a phase inversion when switched through one of the switching transistors as opposed to being switched through the other transistor. This has been explained above with reference to FIG. 1 and it will therefore be understood that this switching results in the cancellation of the signals at frequency, $f_s$ and $f_c$, but also results in the production of a voltage at the frequency $2f_c$. The production of the voltage at frequency $2f_c$ is not a disadvantage since this is easily blocked by means of the filter referred to above which is provided on the modulator output circuit connected to output terminal 54 (FIG. 4).

It will be apparent that alternative circuits to that illustrated in FIG. 4 may be conveniently provided wherein the resistors 26 and 44 and capacitor 76 are omitted whilst the resistors 78 and 90 are connected to the positive supply line 22. Furthermore, all the transistors may be replaced by transistors of the PNP type. This results in a circuit having both input and output signals referred to a positive ground since a negative supply voltage is provided.

In a further modification the transistor 62 may be omitted and both the information signal input and the carrier signal input may fed through the transistor 60. This will not, however, provide isolation between the carrier signal input and the information signal inputs and it would appear that this arrangement would also suffer from the disadvantage of a large reduction in the balance obtained when the supply voltage and temperature changes.

There has been described above, particularly with reference to FIG. 1, a simplified economical double-balanced modulator circuit using two transistors and five resistors, the required phase inversion and switching being achieved in the transformerless modulator. Whilst the described modulator would appear to be cheaper to manufacture and much smaller than the above-mentioned previous modulators, further improvements could well be achieved by producing the modulator in an integrated circuit form.

I claim:

1. A modulator comprising:

a. a first and a second transistor having a common collector load connected between the collector electrodes of said transistors and a first potential point;

b. a first resistor circuit connected between said first potential point and a second potential point at a different potential;

c. the base electrode of the first transistor being connected to a first intermediate tapping point in said first resistor circuit, and to the emitter of said second transistor;

d. a second resistor circuit connected between said first potential point and said second potential point;

e. the base electrode of the second transistor being connected to a second intermediate tapping point in said second resistor circuit, and to the emitter of said first transistor;

f. means for applying a first voltage input signal to the first intermediate tapping point; and g. means for applying a second voltage input signal to the second intermediate tapping point;

h. whereby the output signal obtainable from said common collector load is a modulated combination of said first and second voltage input signals.

2. A modulator according to claim 1 wherein the frequency of said modulated combination is the sum and/or difference of the frequencies of said first and second input signals.

3. A modulator according to claim 1 wherein said first signal is an information signal applied to the base electrode of said first transistor and said second input signal is a carrier signal applied to the base electrode of said second transistor.

4. A modulator according to claim 3 wherein said information signal is applied through a first driver transistor stage to the base electrode of said first transistor and said carrier input signal is applied through a second driver transistor stage to the base electrode of said second transistor.